United States Patent
Liken et al.

(10) Patent No.: US 9,398,270 B2
(45) Date of Patent: Jul. 19, 2016

(54) IMAGING SYSTEM AND METHOD FOR DETECTING A BRIGHT CITY CONDITION

(71) Applicant: Gentex Corporation, Zeeland, MI (US)

(72) Inventors: Peter A. Liken, West Olive, MI (US); Phillip R. Pierce, Grand Rapids, MI (US); Troy A. Redder, Grand Haven, MI (US)

(73) Assignee: GENTEX CORPORATION, Zeeland, MI (US)

( * ) Notice: Subject to any disclaimer, the term of this patent is extended or adjusted under 35 U.S.C. 154(b) by 92 days.

(21) Appl. No.: 14/095,518

(22) Filed: Dec. 3, 2013

(65) Prior Publication Data

US 2014/0152826 A1    Jun. 5, 2014

Related U.S. Application Data

(60) Provisional application No. 61/733,088, filed on Dec. 4, 2012.

(51) Int. Cl.
  *H04N 7/18* (2006.01)
  *B60Q 1/14* (2006.01)
  (Continued)

(52) U.S. Cl.
  CPC ............... *H04N 7/183* (2013.01); *B60Q 1/143* (2013.01); *B60Q 1/2603* (2013.01); *B60Q 2300/314* (2013.01); *B60Q 2300/332* (2013.01); *B60R 2001/1223* (2013.01)

(58) Field of Classification Search
  CPC ............... B60Q 2300/42; B60Q 2300/312; B60Q 2300/41; B60Q 1/085; B60Q 2300/054; B60Q 1/143; B60Q 2300/314; B60Q 2300/3321; B60Q 2300/112; B60Q 1/1423; B60Q 2300/332; B60Q 1/18; B60Q 2300/056; B60Q 1/04; B60Q 3/00; B60Q 1/14; G06K 9/00825; G06K 9/2027
  USPC .......................... 315/82, 77; 382/104; 362/465
  See application file for complete search history.

(56) References Cited

U.S. PATENT DOCUMENTS 5,422,792 A    6/1995    Neumann
5,426,571 A    6/1995    Jones (Continued)

FOREIGN PATENT DOCUMENTS

EP    2463149    6/2012
WO    2007100921    9/2007

OTHER PUBLICATIONS

Patent Cooperation Treaty, International Searching Authority, International Search Report, Written Opinion of the International Searching Authority and Notification of Transmittal, May 7, 2014 6 Pages.

(Continued)

*Primary Examiner* — Sath V Perungavoor
*Assistant Examiner* — Nathaniel Aynalem
(74) *Attorney, Agent, or Firm* — Price Heneveld LLP; Scott P. Ryan

(57) ABSTRACT

An imaging system and method is provided that generates image data. A processor is configured to process the image data and to generate a signal in response to analysis of the image data and a selected mode of operation. The processor selects either a village mode or a non-village mode as a mode of operation depending on whether at least one characteristic in the image data meets village detect conditions. The processor monitors an ambient light level over a period of time and modifies the village detect conditions when the ambient light level reaches a threshold that indicates that the driver's eyes have adapted to a bright ambient light level.

18 Claims, 2 Drawing Sheets

(51) Int. Cl.
    *B60Q 1/26*    (2006.01)
    *B60R 1/12*    (2006.01)

(56) References Cited

U.S. PATENT DOCUMENTS

| | | | |
|---|---|---|---|
| 5,837,994 | A | 11/1998 | Stam et al. |
| 5,990,469 | A | 11/1999 | Bechtel et al. |
| 6,049,171 | A | 4/2000 | Stam et al. |
| 6,056,424 | A * | 5/2000 | DiNunzio ............... 362/490 |
| 6,906,467 | B2 * | 6/2005 | Stam et al. ............. 315/82 |
| 6,928,180 | B2 | 8/2005 | Stam et al. |
| 8,045,760 | B2 | 10/2011 | Stam et al. |
| 8,100,552 | B2 | 1/2012 | Spero |
| 8,254,635 | B2 | 8/2012 | Stein et al. |
| 8,425,092 | B2 * | 4/2013 | Kobayashi ............. 362/466 |
| 2004/0201483 | A1 | 10/2004 | Stam et al. |
| 2004/0239243 | A1 | 12/2004 | Roberts et al. |
| 2010/0052550 | A1 * | 3/2010 | Kobayashi ............. 315/158 |
| 2010/0265330 | A1 | 10/2010 | Li et al. |
| 2011/0280026 | A1 | 11/2011 | Higgins-Luthman |
| 2012/0203427 | A1 | 8/2012 | Ehlgen et al. |

OTHER PUBLICATIONS

Clark, Jason, Nighttime Evaluation of the Effects of Disability and Discomfort Glare from Various Headlamps under Low and High Light Adaptation Levels, Master of Science in Industrial and Systems Engineering at Virginia Polytechnic Institute and State University, Nov. 17, 2004, Blacksburg, Virginia.

Fors, Carina and Lundkvist, Sven-Olof, Night-time Traffic in Urban Areas—A literature Review on Road User Aspects, VTI Rapport 650A, 2009, www.vti.se/publications.

Zwahlen, Helmut T. and Schnell, Thomas, Visual Target Detection Models for Civil Twilight and Night Driving Conditions, Transportation Research Record: Journal of the Transportation Research Board, Jan. 30, 2007, pp. 49-65, vol. 1692/1999, Transportation Research Board of the National Academies.

* cited by examiner

IMAGING SYSTEM AND METHOD FOR DETECTING A BRIGHT CITY CONDITION

CROSS-REFERENCE TO RELATED APPLICATION

This application claims priority to and the benefit under 35 U.S.C. §119(e) of U.S. Provisional Patent Application No. 61/733,088, filed on Dec. 4, 2012, entitled "SYSTEM AND METHOD FOR CONTROLLING EXTERIOR VEHICLE LIGHTS IN LARGE CITY ENVIRONMENTS TO IMPROVE SAFETY," the entire disclosure of which is hereby incorporated herein by reference.

FIELD OF THE INVENTION

The present invention generally relates to an imaging system and method capable of controlling exterior lights of a controlled vehicle, and more specifically relates to an imaging system and method that may be used to control exterior lights of a controlled vehicle in response to a detected condition.

SUMMARY OF THE INVENTION

According to one aspect of the present invention, an imaging system is provided and includes an image sensor configured to image a scene external and forward of a controlled vehicle and to generate image data corresponding to the acquired images. A processor is configured to receive and analyze the image data. The processor generates a signal in response to analysis of the image data and in response to a selected mode of operation. The processor analyzes the image data to detect at least one characteristic in the image data and selects a village mode as a mode of operation when the at least one characteristic meets village detect conditions. The processor monitors an ambient light level over a period of time and modifies the village detect conditions when the ambient light level reaches a threshold that indicates that the driver's eyes have adapted to a bright ambient light level. The processor continues to analyze the image data to detect the at least one characteristic in the image data and selects a non-village mode as a mode of operation when the at least one characteristic no longer meets the village detect conditions.

According to another aspect of the present invention, an imaging method is provided and includes the steps of providing an image sensor for imaging a scene external and forward of a controlled vehicle and generating image data corresponding to the acquired images. The image data is received and analyzed in a processor to detect at least one characteristic of the image data. A signal is generated in response to analysis of the image data and in response to a selected mode of operation. A mode of operation is selected from at least the following modes of operation: a village mode and at least one non-village mode. The village mode is selected if the at least one characteristic reaches a first threshold. The at least one non-village mode is selected if the at least one characteristic has not or no longer reaches the first threshold. An ambient light level is monitored over a period of time and the first threshold is modified when the ambient light level reaches a second threshold that indicates that the driver's eyes have adapted to a bright ambient light level.

According to another aspect of the present invention, a non-transitory computer readable medium is provided having stored thereon software instructions executed by a processor. The software instructions include the steps of imaging a scene external and forward of a controlled vehicle and generating image data corresponding to the acquired images. The image data is received and analyzed to detect at least one characteristic of the image data. A signal is generated in response to analysis of the image data and in response to a selected mode of operation. A mode of operation is selected from at least the following modes of operation: a village mode and at least one non-village mode. The village mode is selected if the at least one characteristic reaches a first threshold. The at least one non-village mode is selected if the at least one characteristic has not or no longer reaches the first threshold. An ambient light level is monitored over a period of time and the first threshold is modified when the ambient light level reaches a second threshold that indicates that the driver's eyes have adapted to a bright ambient light level.

These and other features, advantages, and objects of the present invention will be further understood and appreciated by those skilled in the art by reference to the following specification, claims, and appended drawings.

BRIEF DESCRIPTION OF THE DRAWINGS

The present invention will be become more fully understood from the detailed description and the accompanying drawings, wherein.

DETAILED DESCRIPTION OF THE PREFERRED EMBODIMENTS

Figure 1:
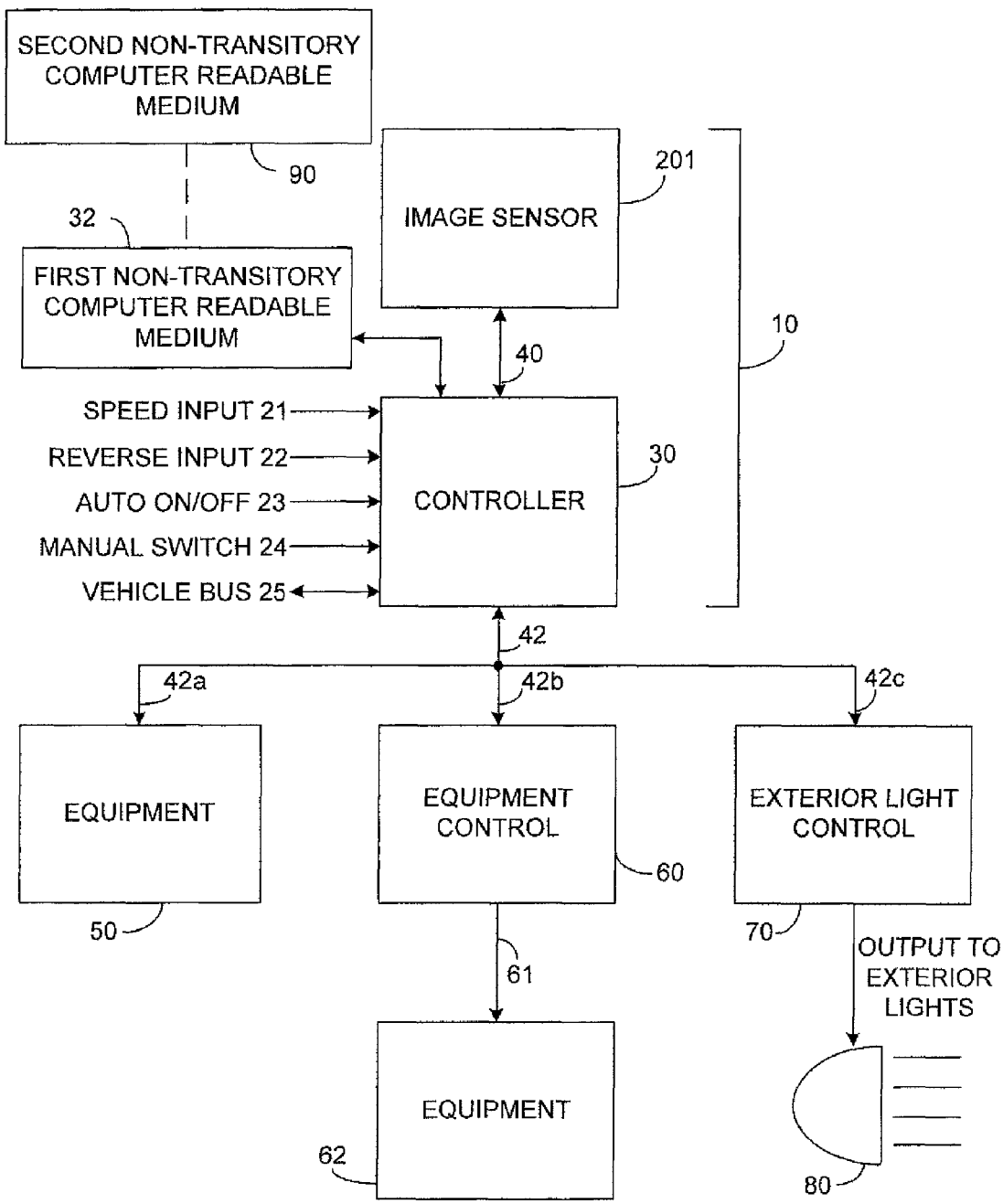
FIG. 1 is a block diagram of an imaging system constructed according to an embodiment of the present invention.

Reference will now be made in detail to the present preferred embodiments of the invention, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

The embodiments described herein relate to an imaging system capable of controlling exterior lights of a controlled vehicle in response to image data acquired from an image sensor, which captures images forward of the vehicle. Auto High Beam (AHB) and alternate methods of controlling the light beam illumination in front of a motor vehicle maximizes the use of high beams at night by identifying oncoming and preceding vehicles and automatically controlling the high beam lighting pattern. This prevents glare to other vehicles, yet maintains a high beam light distribution to illuminate areas not occupied by other vehicles. Prior systems are known for controlling exterior vehicle lights in response to images captured forward of the vehicle. In these prior systems, a controller would analyze the captured images and determine if any preceding or oncoming vehicles were present in a glare area in front of the vehicle employing the system. This "glare area" was the area in which the exterior lights would cause excessive glare to a driver if the exterior lights were in a high beam state (or some state other than a low beam state). If a vehicle was present in the glare area, the controller would respond by changing the state of the exterior lights so as to not cause glare for the other driver(s). Glare to other drivers can be prevented by moving a blocking mechanism in the high beam headlamps that blocks portions of the light otherwise generated by the headlamps from projecting in selected glare-free regions of the forward scene. Examples of such systems are described in U.S. Pat. Nos. 5,837,994, 5,990,469, 6,008,486, 6,049,171, 6,130,421, 6,130,448, 6,166,698, 6,255,639, 6,379,013, 6,403,942, 6,587,573, 6,593,698, 6,611,610, 6,631,316, 6,653,614, 6,728,393, 6,774,988, 6,861,809, 6,906,467, 6,947,577, 7,321,112, 7,417,221, 7,565,006, 7,567,291, 7,653,215, 7,683,326, 7,881,839, 8,045,760, and 8,120,652, as well as in U.S. patent application Ser. No. 13/432,250 entitled "VEHICULAR IMAGING SYSTEM AND METHOD FOR DETERMINING ROADWAY WIDTH" and filed on Mar. 28, 2012, by Jeremy A. Schut et al., the entire disclosures of which are incorporated herein by reference.

In some of the prior systems using AHB or alternative methods of controlling the light beam illumination in front of a motor vehicle, the controller would analyze the captured images to detect whether the vehicle was in or entering a village (or town) that is sufficiently lighted. The controller would then typically either place the exterior lights in a low beam state or otherwise inhibit operation of high beam headlamps. The high beams or alternate beam illumination are then reactivated when the village area is exited. Various methods are used including detecting street lights or measuring the ambient brightness level when entering or exiting a village to determine whether to deactivate or re-activate the high beam headlamps. Examples of such systems are described in U.S. Pat. Nos. 6,861,809, 7,565,006, and 8,045,760, and also in U.S. patent application Ser. No. 13/486,636 filed on Jun. 1, 2012, by Peter A. Liken et al., entitled "SYSTEM AND METHOD FOR CONTROLLING VEHICLE EQUIPMENT RESPONSIVE TO A MULTI-STAGE VILLAGE DETECTION," the entire disclosures of which are incorporated herein by reference.

When entering villages, drivers have typically been driving in a dark condition, where they have been using high beam illumination, when possible. In this case, the drivers' eyes would have transitioned into a state of near scotopic vision, where the eyes have adapted to the dark conditions of driving in the country. When entering the village, the drivers' eyes are sensitive to the darker conditions and there is sufficient lighting to not require the use of high beams. Therefore, in prior systems the village condition is detected and high beams are disabled.

For drivers that have been driving at night in bright conditions, such as, large cities with many lights, there is enough ambient light that their eyes adjust to the brighter conditions and remain in a state of mesopic vision to near photopic vision, depending on the brightness level of the ambient lighting. However, when they suddenly turn down a dark side street, or enter a dark area, their eyes may not have adjusted to the darkness due to being in a state of mesopic vision or near photopic vision. In these dark areas, the ambient brightness level is still high and sufficiently lighted for drivers exhibiting a state of near scotopic vision, but not lighted well enough for drivers exhibiting a state of mesopic vision or near photopic vision. As a result, the drivers may desire to use their high beams to improve visibility. Unfortunately, in prior systems, these dark areas may still be considered in a village condition, thereby keeping the high beams disabled. Therefore, the drivers must manually activate the high beams in such dark areas, if needed for visibility.

To address the above problem, the imaging system described below allows for an AHB system, or alternate methods of controlling the light beam illumination in front of a motor vehicle, to detect when a driver has been driving in a bright city condition and adjusts the village detection settings to allow entering and exiting a village mode based on a state of mesopic vision, or near photopic vision where the drivers' eyes have adjusted to the bright city conditions.

A first embodiment of an imaging system 10 is shown in FIG. 1. Imaging system 10 is capable of controlling exterior lights 80 and, optionally, other equipment (50, 62) of a controlled vehicle. Imaging system 10 includes an image sensor 201 and a controller 30. Image sensor 201 is configured to image a scene external and forward of the controlled vehicle and to generate image data corresponding to the acquired images. Controller 30 receives and analyzes the image data and generates a signal that is used to control exterior lights 80 and may generate other signals to control any additional equipment (50, 62). These signals are generated in response to analysis of the image data.

Controller 30 may be configured to directly connect to the equipment (50) being controlled such that the generated signals directly control the equipment. Alternatively, controller 30 may be configured to connect to an equipment control (60 and 70), which, in turn, is connected to the equipment being controlled (62 and 80) such that the signals generated by controller 30 only indirectly control the equipment. For example, in the case of the equipment being exterior lights 80, controller 30 may analyze the image data from image sensor 201 so as to generate signals that are more of a recommendation for an exterior light control 70 to use when controlling exterior lights 80. The signals may further include not just a recommendation, but also a code representing a reason for the recommendation so that equipment controls (60 and 70) may determine whether or not to override a recommendation. Further, as described in detail below, the signal may include an indication of the detection of a bright city condition (or bright city mode). Such a bright city mode indication is particularly useful when an equipment control (60 and 70) that is separate from controller 30 performs the direct control of the equipment.

By providing a bright city mode indication, controller 30 provides additional information to exterior light control 70 and/or equipment control 60 that was not previously made available to such equipment controls. This allows the vehicle manufacturer more flexibility in how they choose to respond to the bright city mode indication or the indication of some other mode following a prior indication of a bright city mode, examples of which are to turn the high beam lighting off or extend the delay following a determination that bright city condition is no longer detected so as to delay turning the high beam lighting back on.

Alternatively, controller 30 could instead generate a signal that includes an indication of the detection of a village as it previously would have, but then subsequently generate a signal that includes an indication that a village is no longer detected when the above-mentioned dark areas of the city are present. This would allow for existing exterior light controls 70 to operate without modification while allowing the high beams to be reactivated in the dark areas of the city unlike prior systems. As described below, this may be accomplished by monitoring ambient light levels over time and determining when an ambient brightness level reaches a threshold that indicates that the driver's eyes have adapted to bright ambient light levels. If this threshold is reached, the controller may modify the village detect conditions.

As shown in FIG. 1, various inputs (such as inputs 21-24) may be provided to controller 30 that may be taken into account in forming a recommendation or direct signal. In some cases, such inputs may instead be provided to equipment control (60 and 70). For example, input from manual switches may be provided to equipment control (60 and 70), which may allow equipment control (60 and 70) to override a recommendation from controller 30. It will be appreciated that various levels of interaction and cooperation between controller 30 and equipment controls (60 and 70) may exist. One reason for separating control functions is to allow image sensor 201 to be located in the best location in the vehicle for obtaining images, which may be a distance from the equipment to be controlled and to allow communication over the vehicle bus 25.

According to one embodiment, the controller 30 generates a signal that may be used to control one or more exterior lights 80. In this embodiment, exterior lights 80 may be controlled directly by controller 30 or by an exterior light control 70, which receives the signal from controller 30. As used herein, the "exterior lights" broadly includes any exterior lighting on the vehicle. Such exterior lights may include headlamps (both low and high beam if separate from one another), tail lights, foul weather lights such as fog lights, brake lights, center-mounted stop lights (CHMSLs), turn signals, back-up lights, etc. The exterior lights 80 may be operated in several different modes including conventional low-beam and high-beam states. They may also be operated as daytime running lights, and additionally as super-bright high beams in those countries where they are permitted.

The exterior light brightness may also be continuously varied between the low, high, and super-high states. Separate lights may be provided for obtaining each of these exterior lighting states or the actual brightness of the exterior lights may be varied to provide these different exterior lighting states. In either case, the "perceived brightness" or illumination pattern of the exterior lights 80 is varied. As used herein, the term "perceived brightness" means the brightness of the exterior lights as perceived by an observer outside the vehicle. Most typically, such observers will be drivers or passengers in a preceding vehicle or in a vehicle traveling along the same street in the opposite direction. Ideally, the exterior lights 80 are controlled such that if an observer is located in a vehicle within a "glare area" relative to the vehicle (i.e., the area in which the observer would perceive the brightness of the exterior lights 80 as causing excessive glare), the beam illumination pattern is varied such that the observer is no longer in the glare area. The perceived brightness and/or glare area of the exterior lights 80 may be varied by changing the illumination output of one or more exterior lights 80, by steering one or more lights to change the aim of one or more of the exterior lights 80, selectively blocking or otherwise activating or deactivating some or all of the exterior lights 80, altering the illumination pattern forward of the vehicle, or a combination of the above.

Image sensor 201 may be any conventional system. Examples of suitable image sensors are disclosed in published United States Patent Application Publication Nos. US 2008/0192132 A1 and US 2012/0072080 A1, and in U.S. Provisional Application Nos. 61/500,418 entitled "MEDIAN FILTER" filed on Jun. 23, 2011, by Jon H. Bechtel et al.; 61/544,315 entitled "MEDIAN FILTER" and filed on Oct. 7, 2011, by Jon H. Bechtel et al.; 61/556,864 entitled "HIGH DYNAMIC RANGE CAMERA LOW LIGHT LEVEL FILTERING" filed on Nov. 8, 2011, by Jon H. Bechtel et al., the entire disclosures of which are incorporated herein by reference.

The image sensor 201 captures images that may then be displayed and/or analyzed in order to control vehicle equipment in addition to exterior lights. For example, such image sensors have been used for lane departure warning systems, forward collision warning systems, adaptive cruise control systems, pedestrian detection systems, night vision systems, terrain detection systems, parking assist systems, traffic sign recognition systems, and reverse camera display systems. Examples of systems using image sensors for such purposes are disclosed in U.S. Pat. Nos. 5,837,994, 5,990,469, 6,008,486, 6,049,171, 6,130,421, 6,130,448, 6,166,698, 6,379,013, 6,403,942, 6,587,573, 6,611,610, 6,631,316, 6,774,988, 6,861,809, 7,321,112, 7,417,221, 7,565,006, 7,567,291, 7,653,215, 7,683,326, 7,881,839, 8,045,760, and 8,120,652, and in U.S. Provisional Application Nos. 61/512,213 entitled "RAISED LANE MARKER DETECTION SYSTEM AND METHOD THEREOF" and filed on Jul. 27, 2011, by Brock R. Rycenga et al., and 61/512,158 entitled "COLLISION WARNING SYSTEM AND METHOD THEREOF" and filed on Jul. 27, 2011, by Brock R. Rycenga et al., the entire disclosures of which are incorporated herein by reference.

In the example shown in FIG. 1, image sensor 201 may be controlled by controller 30. Communication of image sensor parameters as well as image data occurs over communication bus 40, which may be a bi-directional serial bus, parallel bus, a combination of both, or other suitable means. Controller 30 serves to perform equipment control functions by analyzing images from image sensor 201, determining an equipment (or exterior light) state based upon information detected within those images, and communicating the determined equipment (or exterior light) state to the equipment 50, equipment control 60, or exterior light control 70 through bus 42, which may be the vehicle bus 25, a CAN bus, a LIN bus or any other suitable communication link. Controller 30 may control the image sensor 201 to be activated in several different modes with different exposure times and different readout windows. Controller 30 may be used to both perform the equipment or exterior light control function and control the parameters of image sensor 201.

Controller 30 can also take advantage of the availability of signals (such as vehicle speed, steering wheel angle, pitch, roll, and yaw) communicated via discreet connections or over the vehicle bus 25 in making decisions regarding the operation of the exterior lights 80. In particular, speed input 21 provides vehicle speed information to the controller 30 from which speed can be a factor in determining the control state for the exterior lights 80 or other equipment. The reverse signal 22 informs controller 30 that the vehicle is in reverse, responsive to which the controller 30 may clear an electrochromic mirror element regardless of signals output from light sensors. Auto ON/OFF switch input 23 is connected to a switch having two states to dictate to controller 30 whether the vehicle exterior lights 80 should be automatically or manually controlled. The auto ON/OFF switch (not shown) connected to the ON/OFF switch input 23 may be incorporated with the headlamp switches that are traditionally mounted on the vehicle dashboard or incorporated into steering wheel column levels. Manual dimmer switch input 24 is connected to a manually actuated switch (not shown) to provide a manual override signal for an exterior light control state. Some or all of the inputs 21, 22, 23, 24 and outputs 42*a*, 42*b*, and 42*c*, as well as any other possible inputs or outputs, such as a steering wheel input, can optionally be provided through vehicle bus 25 shown in FIG. 1. Alternatively, these inputs 21-24 may be provided to equipment control 60 or exterior light control 70.

Controller 30 can control, at least in part, other equipment 50 within the vehicle which is connected to controller 30 via vehicle bus 42. Specifically, the following are some examples of one or more equipment 50 that may be controlled by controller 30: exterior lights 80, a rain sensor, a compass, information displays, windshield wipers, a heater, a defroster, a defogger, an air conditioning system, a telephone system, a navigation system, a security system, a tire pressure monitoring system, a garage door opening transmitter, a remote keyless entry system, a telematics system, a voice recognition system such as a digital signal processor based voice actuation system, a vehicle speed control, interior lights, rearview mirrors, an audio system, an engine control system, and various other switches and other display devices that may be located throughout the vehicle.

In addition, controller 30 may be, at least in part, located within a rearview assembly of a vehicle or located elsewhere within the vehicle. The controller 30 may also use a second controller (or controllers), equipment control 60, which may be located in a rearview assembly or elsewhere in the vehicle in order to control certain kinds of equipment 62. Equipment control 60 can be connected to receive via vehicle bus 42 signals generated by controller 30. Equipment control 60 subsequently communicates and controls equipment 62 via bus 61. For example, equipment control 60 may be a windshield wiper control unit which controls windshield wiper equipment, turning this equipment ON or OFF. Equipment control may also be an electrochromic mirror control unit where controller 30 is programmed to communicate with the electrochromic control unit in order for the electrochromic control unit to change the reflectivity of the electrochromic mirror(s) in response to information obtained from an ambient light sensor, a glare sensor, as well as any other components coupled to the processor. Specifically, equipment control unit 60 in communication with controller 30 may control the following equipment: exterior lights, a rain sensor, a compass, information displays, windshield wipers, a heater, a defroster, a defogger, air conditioning, a telephone system, a navigation system, a security system, a tire pressure monitoring system, a garage door opening transmitter, a remote keyless entry, a telemetry system, a voice recognition system such as a digital signal processor-based voice actuation systems, a vehicle speed, interior lights, rearview mirrors, an audio system, a climate control, an engine control, and various other switches and other display devices that may be located throughout the vehicle.

Figure 2:
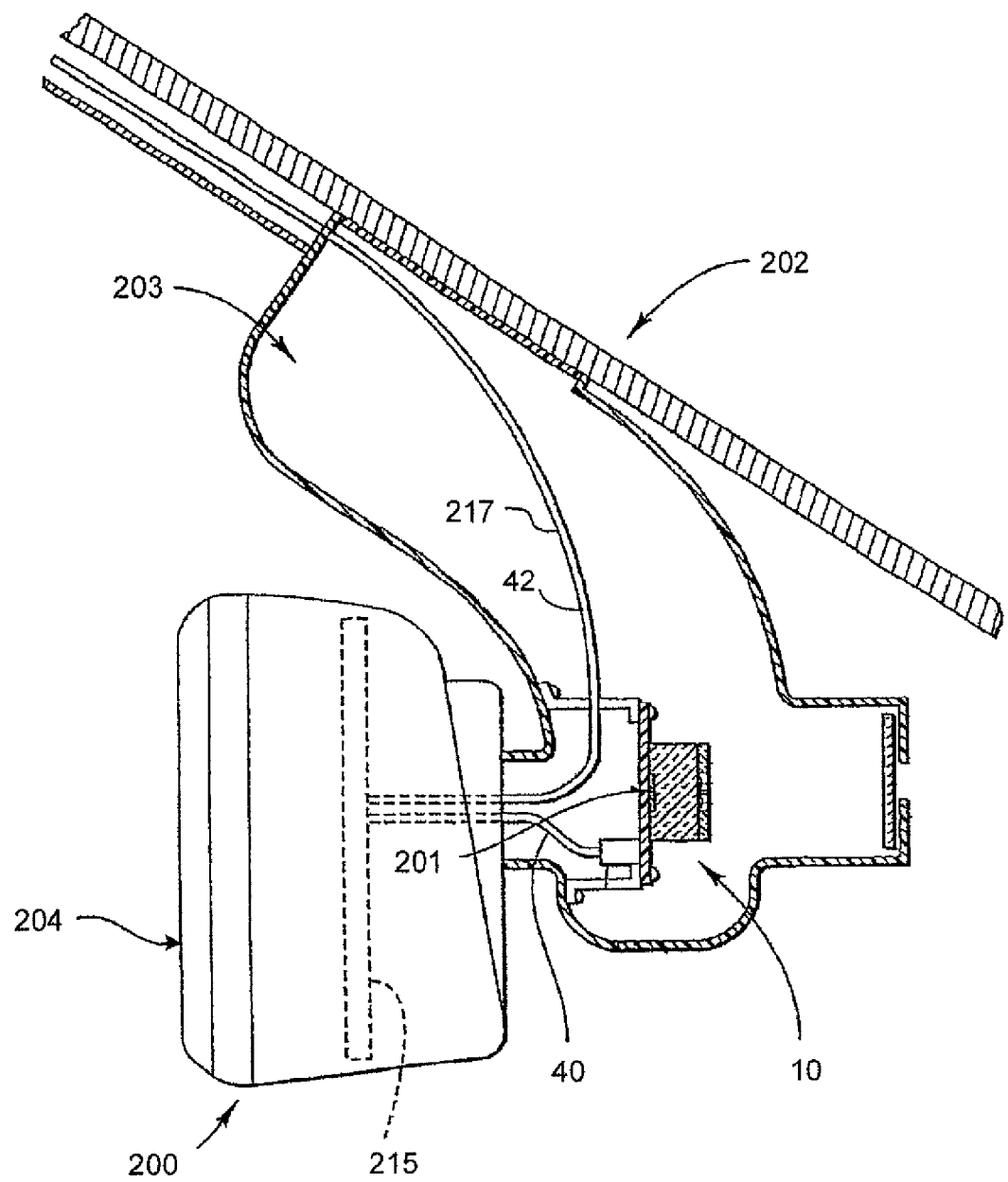
FIG. 2 is a partial cross section of a rearview mirror assembly incorporating the imaging system according to another embodiment of the present invention.

Portions of imaging system 10 can be advantageously integrated into a rearview assembly 200 as illustrated in FIG. 2, wherein image sensor 201 is integrated into a mount 203 of rearview assembly 200. This location provides an unobstructed forward view through a region of the windshield 202 of the vehicle that is typically cleaned by the vehicle's windshield wipers (not shown). Additionally, mounting the image sensor 201 in the rearview assembly 200 permits sharing of circuitry such as the power supply, microcontroller and light sensors.

Referring to FIG. 2, image sensor 201 is mounted within rearview mount 203, which is mounted to vehicle windshield 202. The rearview mount 203 provides an opaque enclosure for the image sensor 201 with the exception of an aperture through which light is received from a forward external scene.

Controller 30 of FIG. 1 may be provided on a main circuit board 215 and mounted in rearview housing 204 as shown in FIG. 2. As discussed above, controller 30 may be connected to image sensor 201 by a bus 40 or other means. The main circuit board 215 may be mounted within rearview housing 204 by conventional means. Power and a communication link 42 with the vehicle electrical system, including the exterior lights 80 (FIG. 1), are provided via a vehicle wiring harness 217 (FIG. 2).

Rearview assembly 200 may include a mirror element or a display that displays a rearward view. The mirror element may be a prismatic element or an electro-optic element, such as an electrochromic element.

Additional details of the manner by which imaging system 10 may be integrated into a rearview mirror assembly 200 are described in U.S. Pat. No. 6,611,610, the entire disclosure of which is incorporated herein by reference. Alternative rearview mirror assembly constructions used to implement exterior light control systems are disclosed in U.S. Pat. No. 6,587,573, the entire disclosure of which is incorporated herein by reference.

The method for controlling exterior lights of a controlled vehicle is described herein as being implemented by controller 30 using image data received from image sensor 201. This method may be a subroutine executed by any processor, and thus this method may be embodied in a non-transitory computer readable medium having stored thereon software instructions that, when executed by a processor, cause the processor to control the equipment of the controlled vehicle, by executing the steps of the method described below. In other words, aspects of the inventive method may be achieved by software stored on a non-transitory computer readable medium or software modifications or updates to existing software residing in a non-transitory computer readable medium. Such software or software updates may be downloaded into a first non-transitory computer readable media 32 of controller 30 (or locally associated with controller 30 or some other processor) typically prior to being installed in a vehicle, from a second non-transitory computer readable media 90 located remote from first non-transitory computer readable media 32. Second non-transitory computer readable media 90 may be in communication with first non-transitory computer readable media 32 by any suitable means, which may at least partially include the Internet or a local or wide area wired or wireless network.

The method for controlling exterior lights of a controlled vehicle includes imaging a scene external and forward of the controlled vehicle and generating image data corresponding to the acquired images. The image data is received and analyzed in the controller 30 and a signal is generated from the controller 30 in response to analysis of the image data and in response to a selected mode of operation. The selected mode of operation is determined by first detecting with the controller 30 at least one characteristic in the image data. If the at least one characteristic meets village detect conditions, the controller 30 selects a village mode as the mode of operation. If the at least one characteristic does not or no longer meets village detect conditions, the controller 30 selects a non-village mode as the mode of operation.

The aforementioned village detect conditions may include thresholds to be reached by the at least one characteristic and/or time periods in which to reach the thresholds. For instance, the controller 30 may use image data to detect an ambient light level and if the detected ambient light level reaches a threshold, the controller 30 selects the village mode as the mode of operation. Conversely, if the detected ambient light level fails to reach or falls below the threshold, the controller 30 selects the non-village mode. In any event, once the controller 30 selects the mode of operation, the controller 30 may generate a signal used to control the exterior lights of the controlled vehicle. As previously described, a vehicle manufacturer may elect to have the signal directly or indirectly control the exterior lights. If the latter is chosen, the signal may be accompanied with an indication of a recommended mode of operation.

To account for bright city conditions, the controller 30 monitors the ambient brightness levels over a long period of time at night. When the ambient brightness level reaches a threshold that indicates that the driver's eyes have adapted to the bright ambient levels (e.g. in a state of mesopic or near photopic vision), the village detect conditions are modified. Such modifications may include changing the thresholds and/or time periods associated with the village detect conditions to allow the high beams to be re-enabled in areas now considered to be insufficiently lighted to the drivers' eyes, but previously regarded as meeting village detect conditions. In other words, the system could then operate in a non-village mode when previously not possible. To accomplish this, the controller 30 continues to analyze the image data (after selecting the village mode) to detect the at least one characteristic (e.g. ambient light level) and selects the non-village mode when the at least one characteristic no longer meets the village detect conditions, which have been modified in this case to allow for earlier selection of the non-village mode. Once the non-village is selected, the controller 30 generates a signal, which may directly or indirectly result in the high beams being re-enabled. At this point, the controller 30 may also continue to receive and analyze image data in order to determine whether to select the village mode or remain in the non-village mode. This may be done by checking if the at least one characteristic meets the previously modified village detect conditions or other village detect conditions specified by the controller 30.

Accordingly, the method described above effectively becomes a bright city setting that may allow either high beam activation for AHB systems or activation of alternate methods of controlling the light beam illumination in front of a motor vehicle for drivers that have adjusted to the brighter conditions. This remedies the problem where a driver exhibiting a state of mesopic vision or near photopic vision suddenly encounters a dark area that is insufficiently lighted to the driver's eyes. By providing a means to automatically enable the high beams, the need for manual activation of the high beams in such circumstances may be eliminated or reduced. These settings may be saved for subsequent ignition cycles and only modified again when the driver has been detected to have left the bright city conditions for a length of time.

As used herein, a "non-village mode" is not necessarily a single mode of operation. Such modes may include a normal or default mode, as well as a motorway mode in which the exterior light pattern may be even brighter or have a greater range than a typical high beam pattern.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the claims as interpreted according to the principles of patent law, including the doctrine of equivalents.

What is claimed is:

1. An imaging system comprising:
   an image sensor configured to acquire one or more images of a scene external and forward of a controlled vehicle and to generate image data corresponding to the one or more acquired images; and
   a processor configured to:
   receive the image data;
   analyze the image data to detect an ambient light level in the image data and select a village mode as a mode of operation when the ambient light level meets village detect conditions, wherein selection of the village mode disables the use of high beams in the controlled vehicle;
   monitor the ambient light level over a period of time;
   based on the monitoring, modify the village detect conditions when the ambient light level reaches a threshold that indicates that the driver's eyes have adapted to a bright ambient light level; and
   based on the modification of the village detect conditions, select a non-village mode as a mode of operation, the non-village mode enabling the automatic use of high beams in areas that would have met village detect conditions absent modification thereof.

2. The imaging system of claim 1, wherein the processor is further configured to, based on the selection of the non-village mode, continue to receive and analyze image data in order to determine whether to select the village mode or continue in the non-village mode.

3. The imaging system of claim 1, wherein the ambient light level must reach the threshold within a selected time period.

4. The imaging system of claim 1, wherein modification to the village detect conditions comprises changing the threshold.

5. The imaging system of claim 1, wherein the processor is further configured to generate a signal based on the analysis of the image data and the selected mode of operation, and wherein the signal is used to directly or indirectly control exterior lights of the controlled vehicle.

6. An imaging method, comprising the steps of:
   providing an image sensor for acquiring one or more images of a scene external and forward of a controlled vehicle and generating image data corresponding to the one or more acquired images;
   receiving and analyzing the image data in a processor to detect an ambient light level in the image data;
   selecting a village mode as the mode of operation if the ambient light level meets village detect conditions, wherein selection of the village mode disables the use of high beams in the controlled vehicle;
   monitoring the ambient light level over a period of time;
   based on the monitoring, modifying the village detect conditions when the ambient light level reaches a threshold that indicates that the driver's eyes have adapted to a bright ambient light level; and
   based on the modification of the village detect conditions, select a non-village mode as a mode of operation, the non-village mode enabling the automatic use of high beams in areas that would have village detect conditions absent modification thereof.

7. The imaging method of claim 6, wherein the ambient light level must reach the threshold within a selected time period.

8. The imaging method of claim 6, wherein the step of modifying further comprises changing the threshold.

9. The imaging method of claim 6, wherein the processor is further configured to generate a signal based on the analysis of the image data and the selected mode of operation, and wherein the signal is used to directly or indirectly control the exterior lights of the controlled vehicle.

10. A non-transitory computer readable medium having stored thereon software instructions executed by a processor, the software instructions comprising the steps of:
    acquiring one or more images of a scene external and forward of a controlled vehicle and generating image data corresponding to the acquired images;
    receiving and analyzing the image data to detect an ambient light level in the image data;
    selecting a village mode as the mode of operation if the ambient light level meets village detect conditions, wherein selection of the village mode disables the use of high beams in the controlled vehicle;
    monitoring the ambient light level over a period of time;

based on the monitoring, modifying the village detect conditions when the ambient light level reaches a threshold that indicates that the driver's eyes have adapted to a bright ambient light level;

based on the modification of the village detect conditions selecting a non-village mode as a mode of operation, the non-village mode enabling the automatic use of high beams in areas that would have met village detect conditions absent modification thereof.

11. The non-transitory computer readable medium of claim 10, wherein the ambient light level must reach the threshold within a selected time period.

12. The non-transitory computer readable medium of claim 10, wherein the step of modifying comprises changing the threshold.

13. The non-transitory computer readable medium of claim 10, wherein the processor is further configured to generate a signal based on the analysis of the image data and the selected mode of operation, wherein the signal is used to directly or indirectly control exterior lights of the controlled vehicle.

14. The imaging system of claim 6, wherein the processor is further configured to, based on the selection of a non-village mode, continue to receive and analyze image data in order to determine whether to select the village mode or continue in the non-village mode.

15. The imaging system of claim 10, wherein the processor is further configured to, based on the selection of a non-village mode, continue to receive and analyze image data in order to determine whether to select the village mode or continue in the non-village mode.

16. The imaging system of claim 1, wherein the bright ambient light level is associated with a state of mesopic vision or a state of near photopic vision.

17. The imaging system of claim 6, wherein the bright ambient light level is associated with a state of mesopic vision or a state of near photopic vision.

18. The imaging system of claim 10, wherein the bright ambient light level is associated with a state of mesopic vision or a state of near photopic vision.

* * * * *